(12) United States Patent
Chen (10) Patent No.: US 9,120,475 B2
(45) Date of Patent: Sep. 1, 2015

(54) OIL REPLACEMENT APPARATUS

(76) Inventor: Jui-Pin Chen, Changhua (TW)

( * ) Notice: Subject to any disclaimer, the term of this patent is extended or adjusted under 35 U.S.C. 154(b) by 689 days.

(21) Appl. No.: 13/534,680

(22) Filed: Jun. 27, 2012

(65) Prior Publication Data

US 2014/0000759 A1 Jan. 2, 2014

(51) Int. Cl.
*B65B 31/00* (2006.01)
*B60T 17/22* (2006.01)

(52) U.S. Cl.
CPC .................................. *B60T 17/222* (2013.01)

(58) Field of Classification Search
CPC .......................................................... B60T 12/22
USPC ............................................ 141/59; 188/352
See application file for complete search history.

(56) References Cited

U.S. PATENT DOCUMENTS 6,830,082 B2 * 12/2004 Few ................................ 141/65

* cited by examiner

*Primary Examiner* — Jason K Niesz
(74) *Attorney, Agent, or Firm* — patenttm.us (57) ABSTRACT

An oil replacement apparatus has a housing, an oil replenishing assembly and a controlling assembly. The oil replenishing assembly has a base, a vacuum pump, an oil tank and multiple control cylinders. The base has a canal set formed inside the base. The vacuum pump and the oil tank are mounted on the base and communicate with the canal set. The control cylinders are mounted on the base to close the canal set and can selectively open or close holes of the canal set. The controlling assembly is connected with the oil replenishing assembly. Accordingly, the oil replacement apparatus can automatically drain or inject oil in a hydraulic brake assembly.

12 Claims, 10 Drawing Sheets

OIL REPLACEMENT APPARATUS

BACKGROUND OF THE INVENTION

1. Field of the Invention

The present invention relates to an oil replacement apparatus, and more particularly to an oil replacement apparatus to replace oil automatically.

2. Description of Related Art

Figure 9:
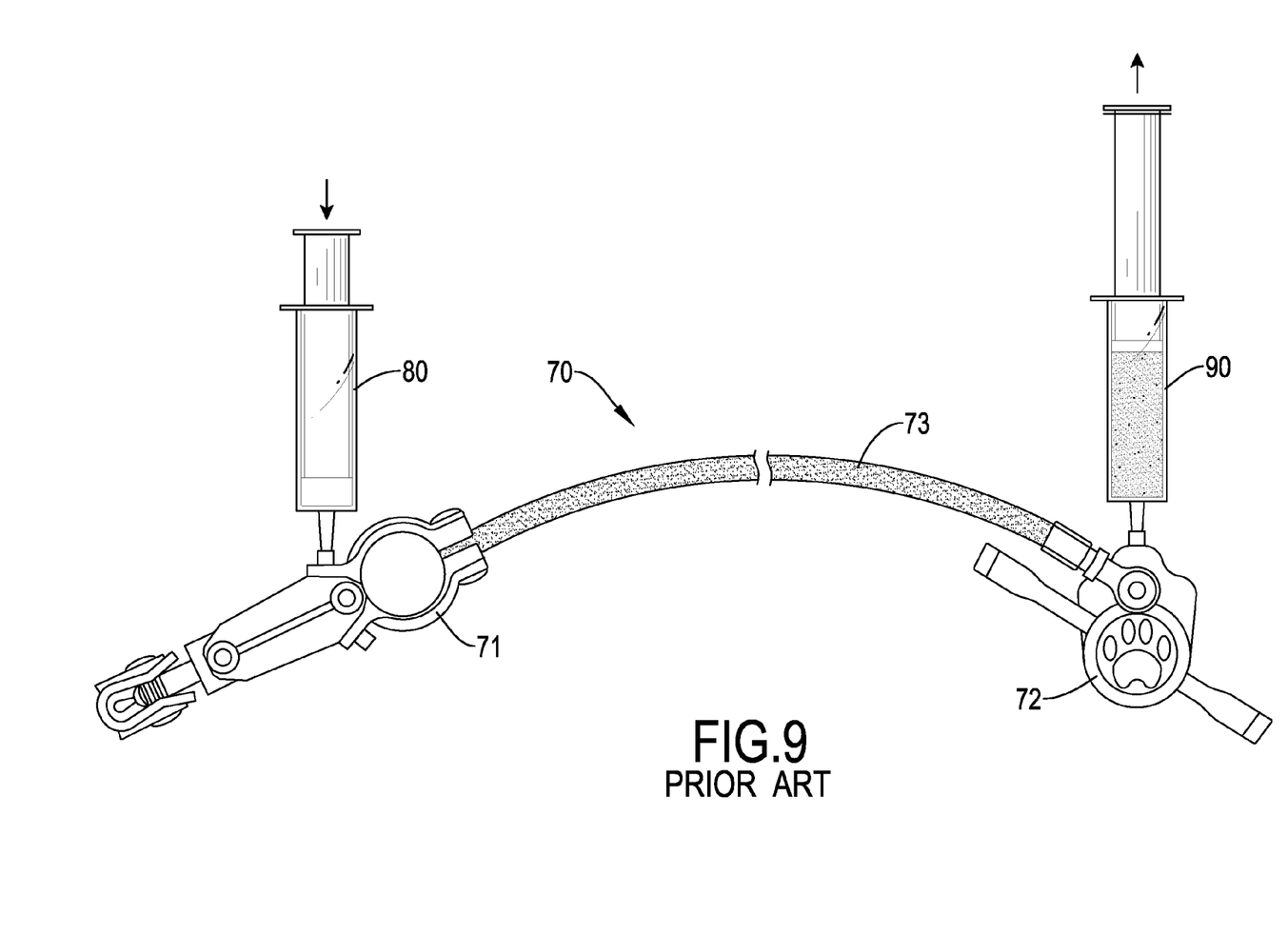
FIG. 9 is an operational view of a conventional hydraulic brake assembly in accordance with the prior art showing the used oil being drained.
Figure 10:
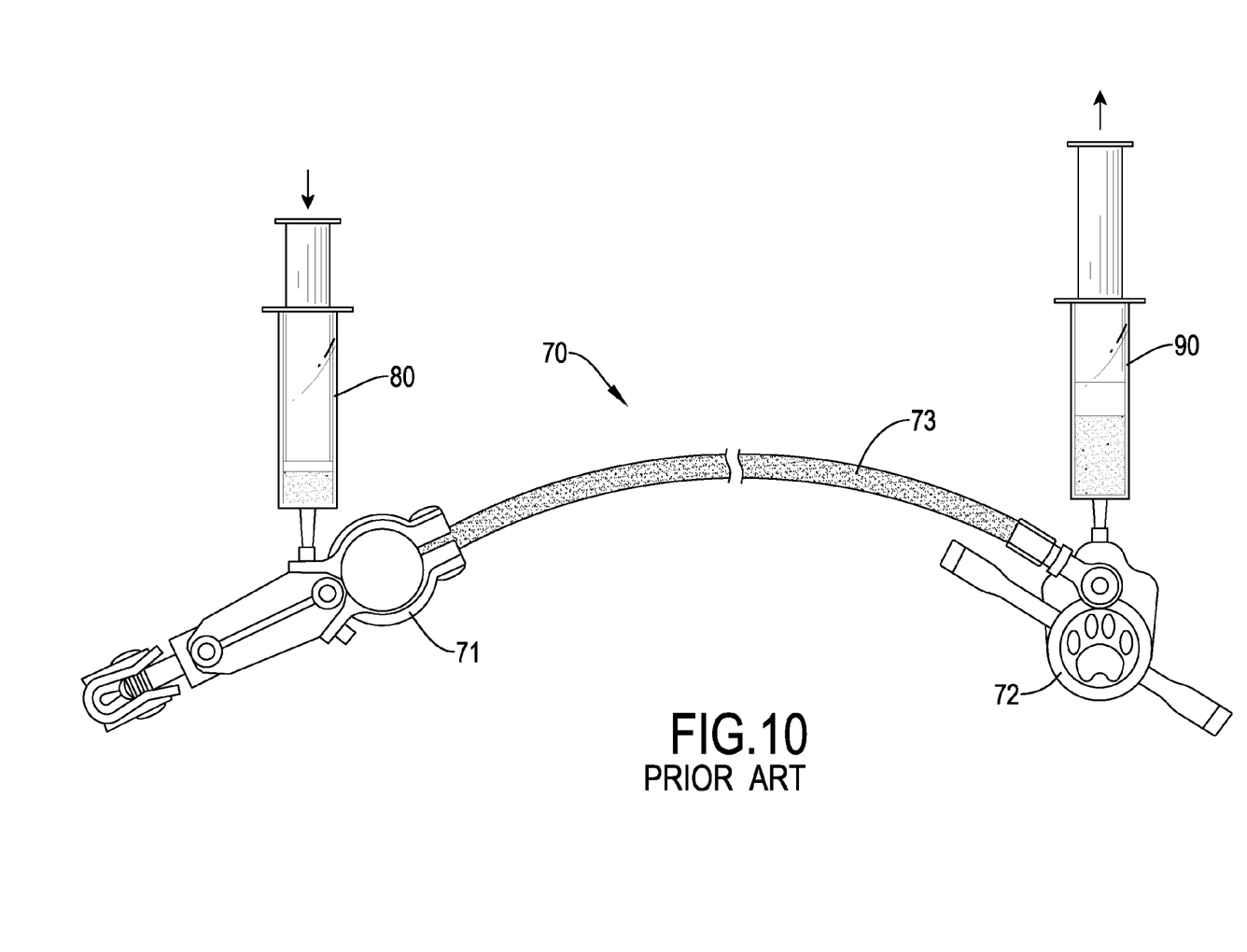
FIG. 10 is an operational view of the conventional hydraulic brake assembly in FIG. 9 showing the new oil being injected.

A conventional hydraulic brake assembly is filled with brake oil, and the brake oil often has to be replaced due to frequent use. With reference to FIGS. 9 and 10, a conventional hydraulic brake assembly 70 is applied to replenish used brake oil manually.

The hydraulic brake assembly 70 has a grip unit 71, a caliper unit 72 and an oil pipe 73. Two opposite ends of the oil pipe 73 are respectively connected with the grip unit 71 and the caliper unit 72. A first syringe 80 and a second syringe 90 are respectively connected with and communicate with the grip unit 71 and the caliper unit 72.

With reference to FIG. 9, to drain used oil out of the hydraulic assembly 70, air is repeatedly and manually pumped by the first syringe 80 to flow into the grip unit 71. The used oil in the hydraulic brake assembly 70 is driven by the air to flow out of the caliper unit 72. Meanwhile the second syringe 90 works to draw the used oil, and enables the used oil to flow into the second syringe 90. Accordingly, the used oil is drained out.

With reference to FIG. 10, to inject new oil into the hydraulic assembly 70, new oil is fully filled in the first syringe 80. The new oil in the first syringe 80 is then manually injected into the hydraulic brake assembly 70, and part of the new oil along with the residual air in the hydraulic brake assembly 70 is drawn into the second syringe 90. Accordingly, the hydraulic brake assembly 70 is replenished with the new oil.

However, the manual replacing process is time-consuming. Moreover, the air in the environment easily enters the first syringe 80 during the period of that the first syringe 80 is filled with new oil, and then enters the hydraulic brake assembly 70.

To overcome the shortcomings, the present invention tends to provide an oil replacement apparatus to mitigate the aforementioned problems.

SUMMARY OF THE INVENTION

The main objective of the invention is to provide an oil replacement apparatus to replace oil automatically.

An oil replacement apparatus has a housing, an oil replenishing assembly and a controlling assembly. The oil replenishing assembly has a base, a vacuum pump, an oil tank and multiple control cylinders. The base has a canal set formed inside the base. The vacuum pump and the oil tank are mounted on the base and communicate with the canal set. The control cylinders are mounted on the base to close the canal set and can selectively open or close holes of the canal set. The controlling assembly is connected with the oil replenishing assembly. Accordingly, the oil replacement apparatus can automatically drain or inject oil in a hydraulic brake assembly.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, a first embodiment of an oil replacement apparatus in accordance with the present invention comprises a housing 10, an oil replenishing assembly 20 and a controlling assembly 30.

Figure 1:
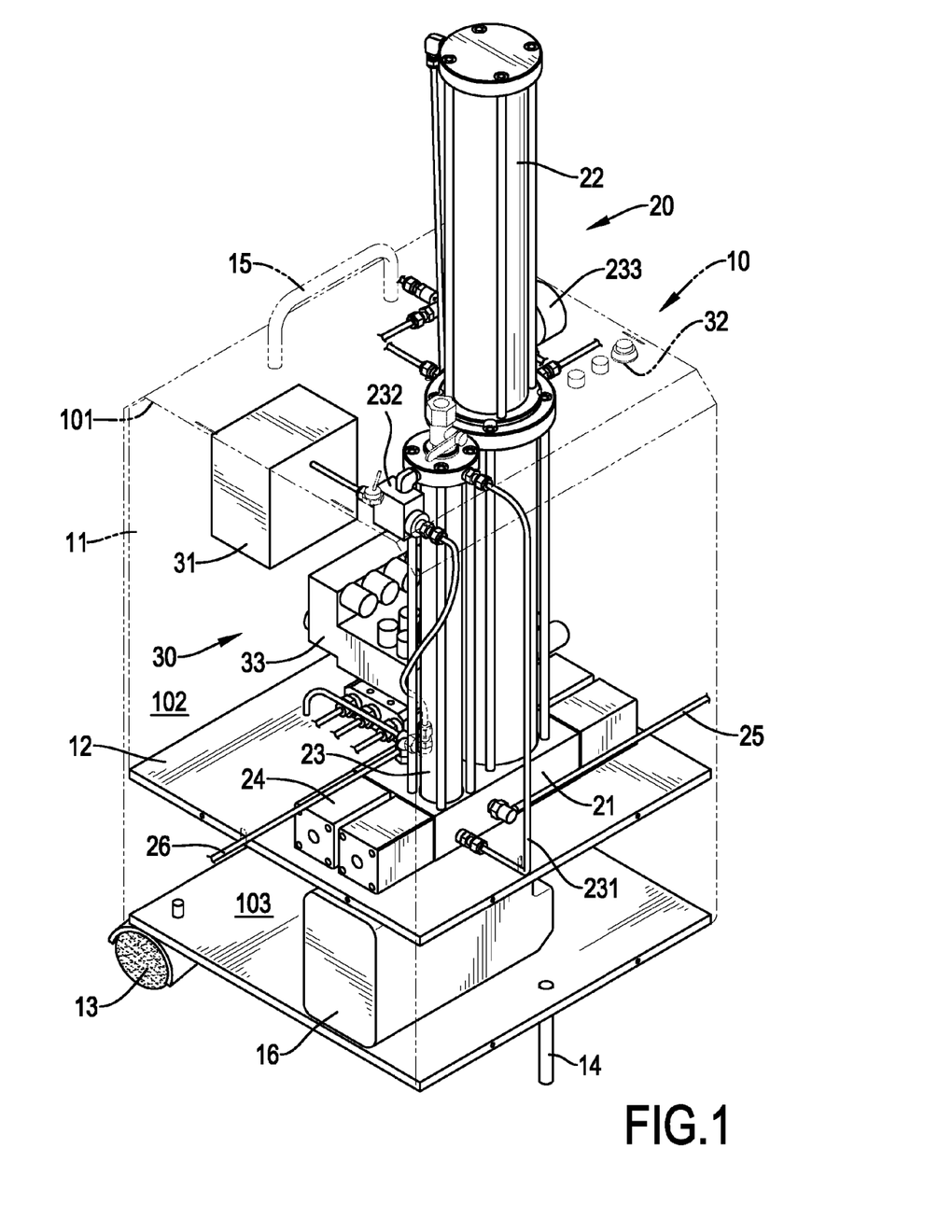
FIG. 1 is a perspective view of a first embodiment of an oil replacement apparatus in accordance with the present invention.
Figure 2:
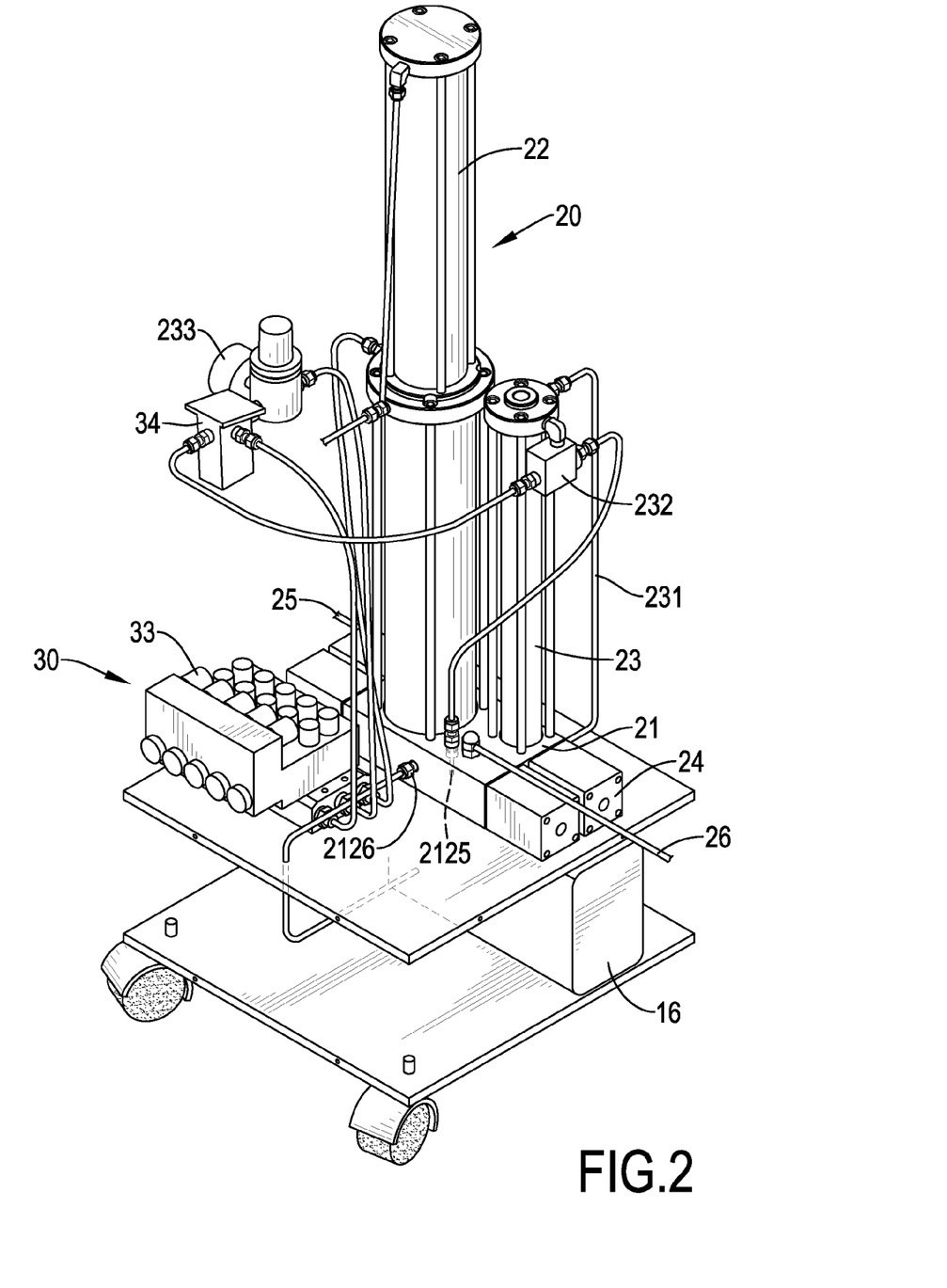
FIG. 2 is a perspective view of the oil replacement apparatus in FIG. 1 with the housing being removed.

The housing 10 is a parallelepiped and has two opposite first side sections, two opposite second side sections, two housing openings 101, a main space 102, a secondary space 103, two side plates 11, a partition 12, two casters 13, a pillar 14, a handle 15 and a jerrican 16.

The house openings 101 are respectively formed in the first side sections of the housing 10. The main space 102 and the secondary space 103 are formed inside the housing 10. The side plates 11 are respectively formed on the second side sections of the housing 10, and each side plate 11 is located between the two house openings 101.

The partition 12 is latitudinally mounted inside the housing 10 to divide an inner space of the housing 10 into the main space 102 and the secondary space 103. The secondary space 103 is located below the main space 102.

The casters 13 and the pillar 14 are located at a bottom of the housing 10. The handle 15 is located at a top of the housing 10. The jerrican 16 is mounted in the secondary space 103.

The oil replenishing assembly 20 is mounted in the main space 102 of the housing 10 and has a base 21, a vacuum pump 22, an oil tank 23, multiple control cylinders 24, an injection pipe 25 and a drainpipe 26.

Figure 3:
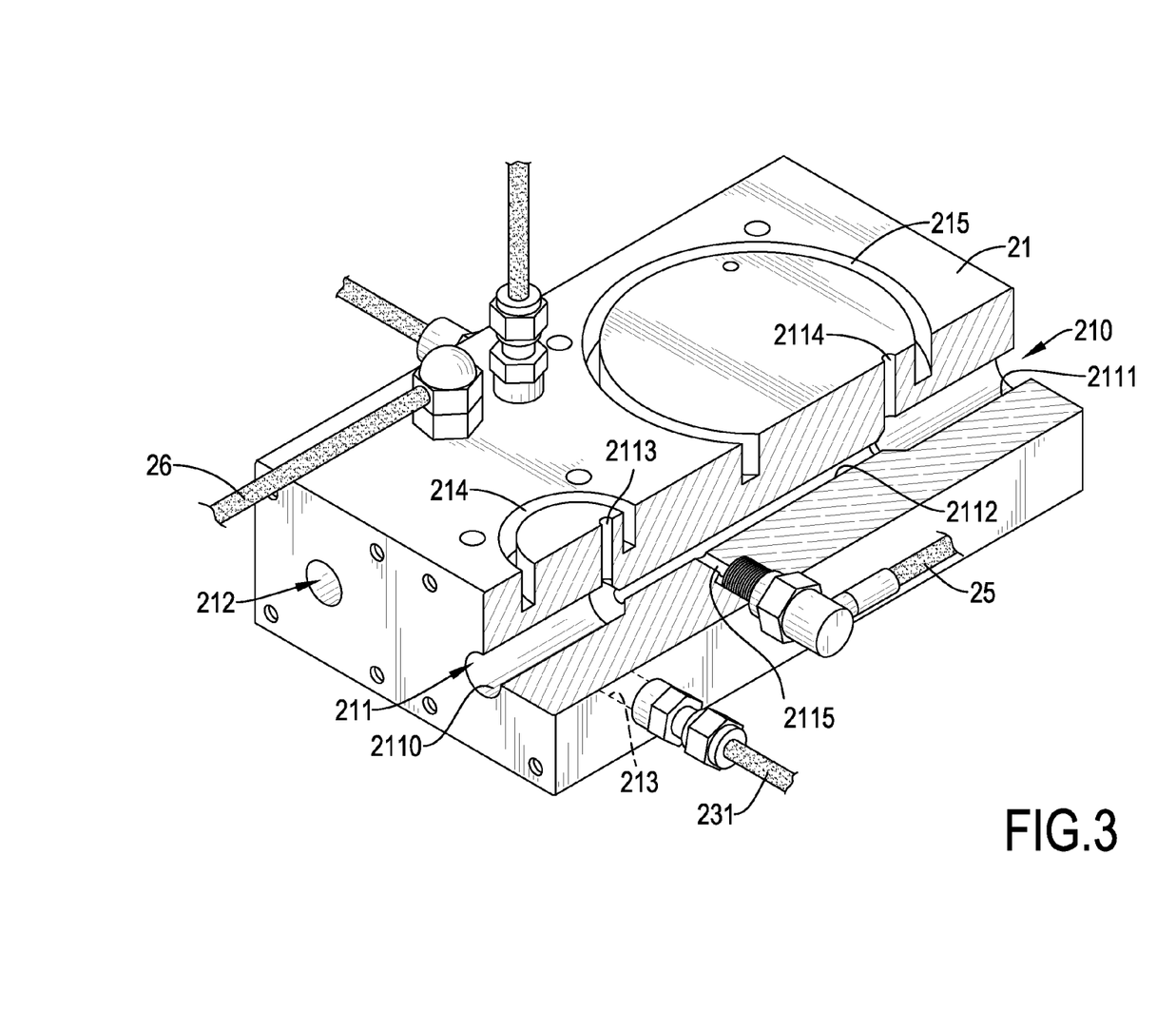
FIG. 3 is an enlarged perspective view in partial section of the oil replacement apparatus in FIG. 1 showing the first channel.
Figure 4:
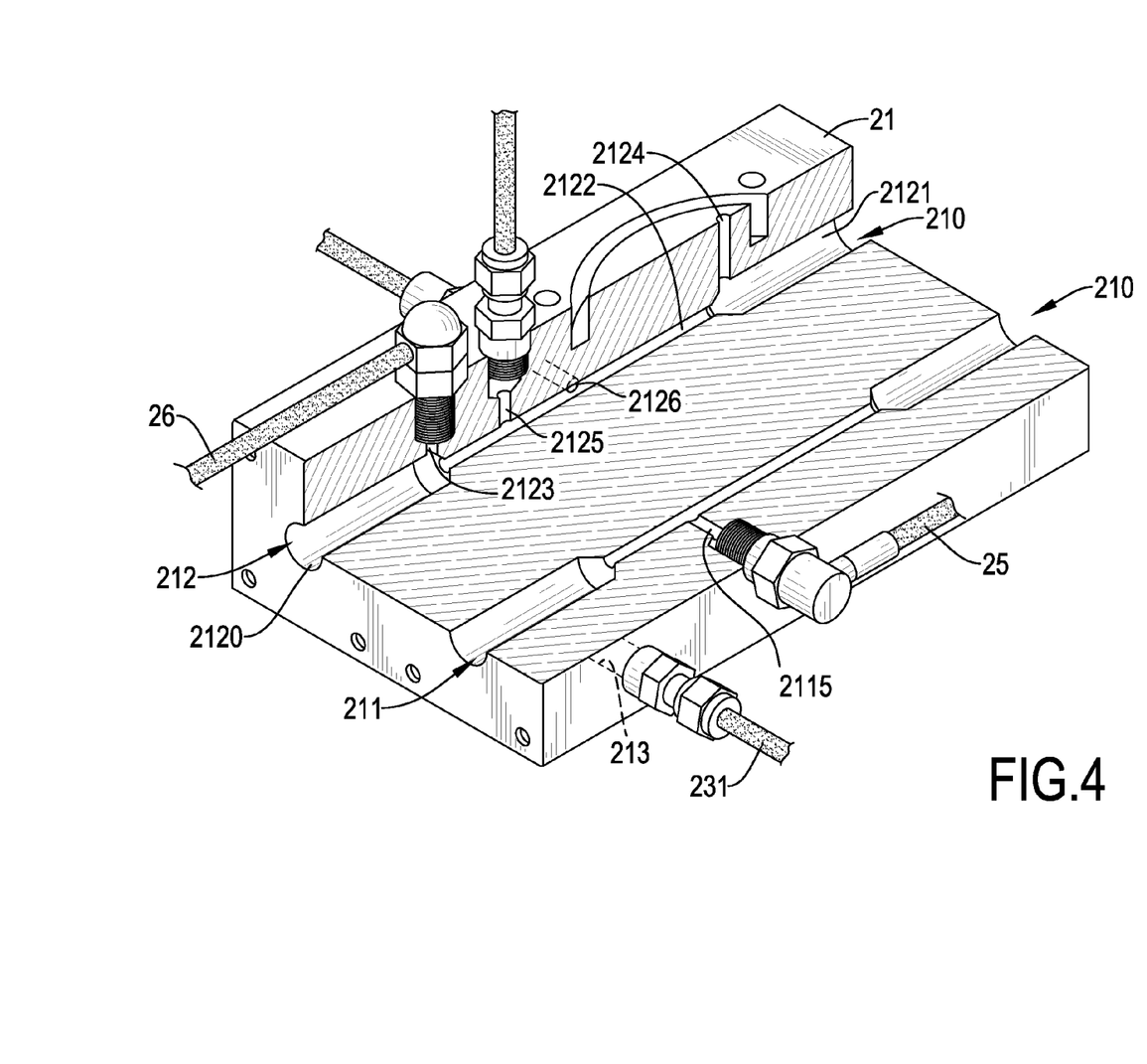
FIG. 4 is an enlarged perspective view in partial section of the oil replacement apparatus in FIG. 1 showing the second channel.

The base 21 is a parallelepiped and has an outer surface and a canal set 210. The outer surface of the base 21 has two opposite first side sections, two opposite second side sections and a top section. The canal set 210 is formed inside the base 21 and has a first channel 211, a second channel 212, a pipe hole 213, a tank-mounting groove 214 and a pump-mounting groove 215.

The first channel 211 is T-shaped, is latitudinally formed through the base 21 and has a left end 2110, a right end 2111, a central segment 2112, an oil inlet 2113, a vent 2114 and an exit 2115.

The left end 2110 and the right end 2111 of the first channel 211 are respectively formed in the first side sections of the outer surface of the base 21, and respectively have an opening.

The central segment 2112 is formed between and connected with the left end 2110 and the right end 2111 of the first channel 211.

The oil inlet 2113 is formed in the top section of the outer surface of the base 21 and is connected with and communicates with the left end 2110 of the first channel 211.

The vent 2114 is formed in the top section of the outer surface of the base 21 and is connected with and communicates with the right end 2111 of the first channel 211.

The exit 2115 is formed in one of the second side sections of the outer surface of the base 21 and is connected with and communicates with the central segment 2112 of the first channel 211.

The second channel 212 is T-shaped, is latitudinally formed through the base 21, is parallel to the first channel 211 and has a left end 2120, a right end 2121, a central segment 2122, an oil entrance 2123, a vent 2124, a releasing hole 2125 and an oil outlet 2126.

The left end 2120 and the right end 2121 of the second channel 212 are respectively formed in the first side sections of the outer surface of the base 21, and respectively have an opening.

The left end 2120 and the right end 2121 are respectively adjacent to the openings of the second channel 212.

The central segment 2122 is formed between and connected with the left end 2120 and the right end 2121 of the second channel 212.

The oil entrance 2123 is formed in the top section of the outer surface of the base 21 and is connected with and communicates with the left end 2120 of the second channel 212.

The vent 2124 of the second channel 212 is formed in the top section of the outer surface of the base 21 and is connected with and communicates with the right end 2121 of the second channel 212.

The releasing hole 2125 is formed in the top section of the outer surface of the base 21, is connected with and communicates with the central segment 2122 of the second channel 212, and is located between the oil entrance 2123 and the vent 2124 of the second channel 212.

Figure 5:
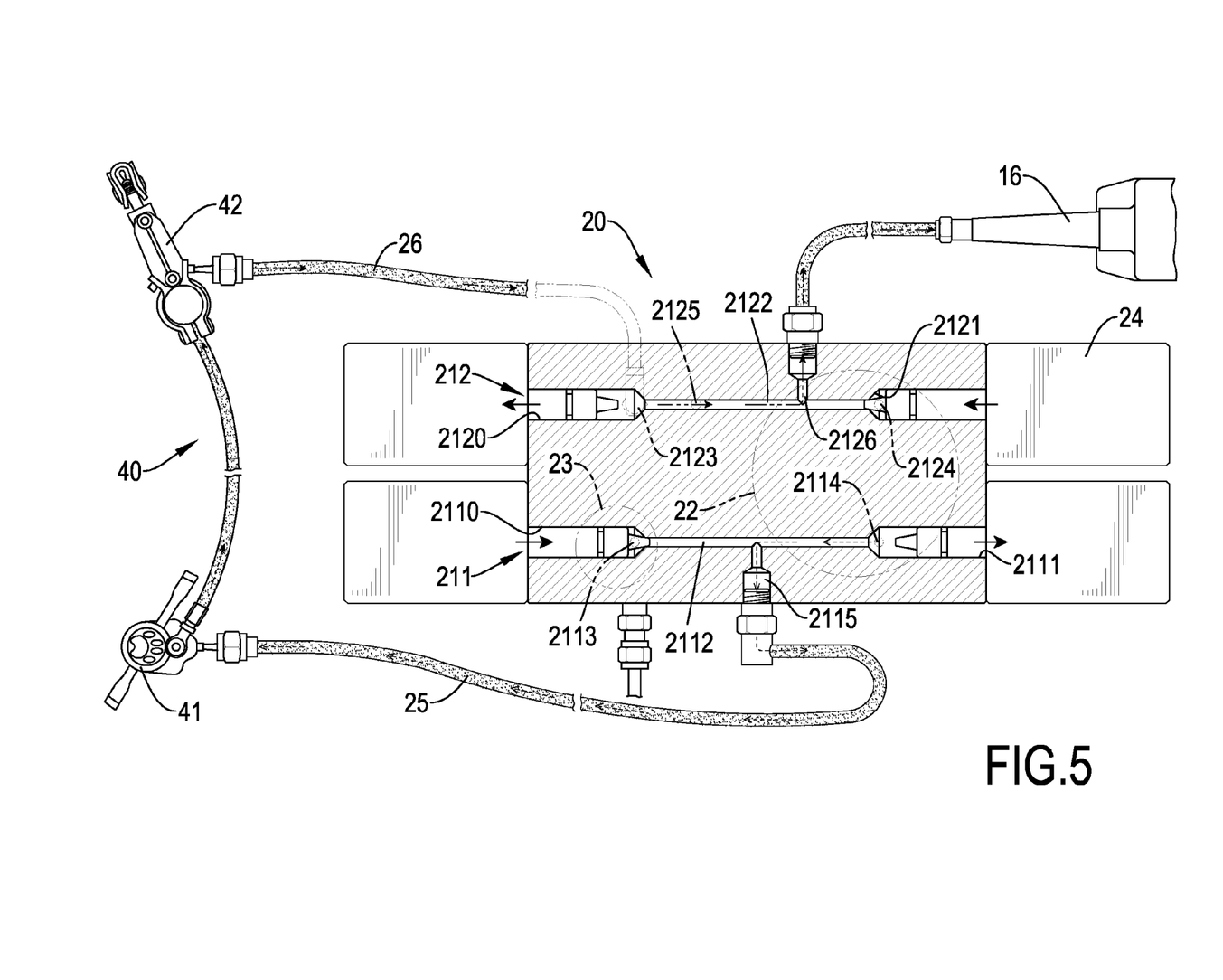
FIG. 5 is an operational top view in partial section of the oil replacement apparatus in FIG. 1 showing the used oil being drained.

With reference to FIGS. 2 and 5, the oil outlet 2126 is formed in one of the second side sections of the outer surface of the base 21, is connected with and communicates with the central segment 2122 of the second channel 212, is opposite to the exit 2115, is located between the releasing hole 2125 and the vent 2124 of the second channel 212, and is connected with and communicates with the jerrican 16.

The pipe hole 213 is formed in one of the second side sections of the outer surface of the base 21, is connected with and communicates with the left end 2110 of the first channel 211, and is adjacent to the oil inlet 2113.

The tank-mounting groove 214 is annular, is formed in the top section of the outer surface of the base 21, and encompasses the oil inlet 2113.

The pump-mounting groove 215 is annular, is formed in the top section of the outer surface of the base 21 beside the tank-mounting groove 214, and encompasses the vents 2114, 2124.

With reference to FIGS. 2 and 3, the vacuum pump 22 is mounted into the pump-mounting hole 215 of the base 21 and communicates with the vent 2114 of the first channel 211 and the vent 2124 of the second channel 212.

The oil tank 23 is mounted into the tank-mounting hole 214 of the base 21, communicates with the oil inlet 2113 and the pipe hole 213 of the first channel 211, and has an oleometer tube 231, a check valve 232 and an aerometer 233. The oleometer tube 231 is connected with and communicates with the pipe hole 213, and is used to show the oil pressure of the oil tank 23. The check valve 232 is connected with the releasing hole 2125. The aerometer 233 is connected with the check valve 232.

With reference to FIG. 5, the control cylinders 24 are respectively mounted on the first side sections of the outer surface of the base 21 to close the openings of the first channel 211 and the second channel 212. Preferably, four control cylinders 24 are implemented and are respectively inserted into the four openings of the first channel 211 and the second channel 212. Each control cylinder 24 is pneumatic and has a movable cylinder rod. The cylinder rods of the four control cylinders 24 are respectively mounted in the left ends 2110, 2120 and the right ends 2111, 2121 of the first channel 211 and the second channel 212 in order to selectively open or close the oil inlet 2113, the oil entrance 2123, the vent 2124 of the second channel 212 and the vent 2114 of the first channel 211.

With reference to FIGS. 1 and 2, the injection pipe 25 is securely connected with and communicates with the exit 2115. The drainpipe 26 is securely connected with and communicates with the oil entrance 2123.

Figure 7:
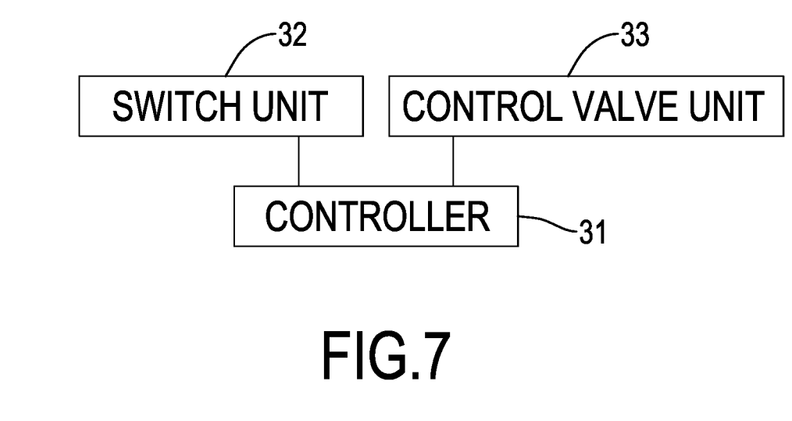
FIG. 7 is a block diagram of the controlling assembly of the oil replacement apparatus in FIG. 1.

With reference to FIGS. 1, 2 and 7, the controlling assembly 30 is mounted in the main space 102 of the housing 10 and has a controller 31, a switch unit 32, a control valve unit 33 and a release solenoid valve 34.

Preferably, the controller 31 is a programmable logic controller (PLC).

The switch unit 32 is mounted on the top of the housing 10, is electrically connected with the controller 31 and has multiple switches capable of corresponding to commands in the controller 31.

The control valve unit 33 is electrically connected with the controller 31 for being controlled by the controller 31 and is connected with the vacuum pump 22 and the control cylinders 24 by tubes. Preferably, the control valve unit 33 has multiple solenoid valves.

The release solenoid valve 34 is connected with the control valve unit 33 and the check valve 232.

With reference to FIGS. 1, 2 and 5, the oil replacement apparatus in accordance with the present invention is connected with a hydraulic brake assembly 40 and is applied to drain used oil in the hydraulic brake assembly 40. The hydraulic assembly 40 has a caliper unit 41 and a grip unit 42. The injection pipe 25 is connected with the caliper unit 41, and the drainpipe 26 is connected with the grip unit 42.

First, the switch unit 32 is pressed and the controller 31 generates a command to activate the control valve unit 33. Accordingly, the control valve unit 33 controls the four cylinder rods of the control cylinders 24 to move in order to selectively open or close the oil inlet 2113, the oil entrance 2123, the vent 2124 of the second channel 212 and the vent 2114 of the first channel 211.

Second, the oil inlet 2113 is closed to prevent oil in the oil tank 23 from flowing out. The vent 2114 of the first channel 211 is opened, the oil entrance 2123 is opened, and the vent 2124 of the second channel 212 is closed. The vacuum pump 22 is controlled by the control valve unit 33 to blow air into the first channel 211 via the vent 2114 of the first channel 211. Then, the air flows through the exit 2115, the injection pipe 25 and into the caliper unit 41.

Third, the used oil in the hydraulic brake assembly 40 is driven by the air and flows out of the hydraulic brake assembly 40, into the drainpipe 26, through the drainpipe 26 and the second channel 212. Consequently, the used oil flows through the central segment 2122 of the second channel 212 and into the jerrican 16 via the oil outlet 2126. Accordingly, the used oil is drained out automatically.

Figure 6:
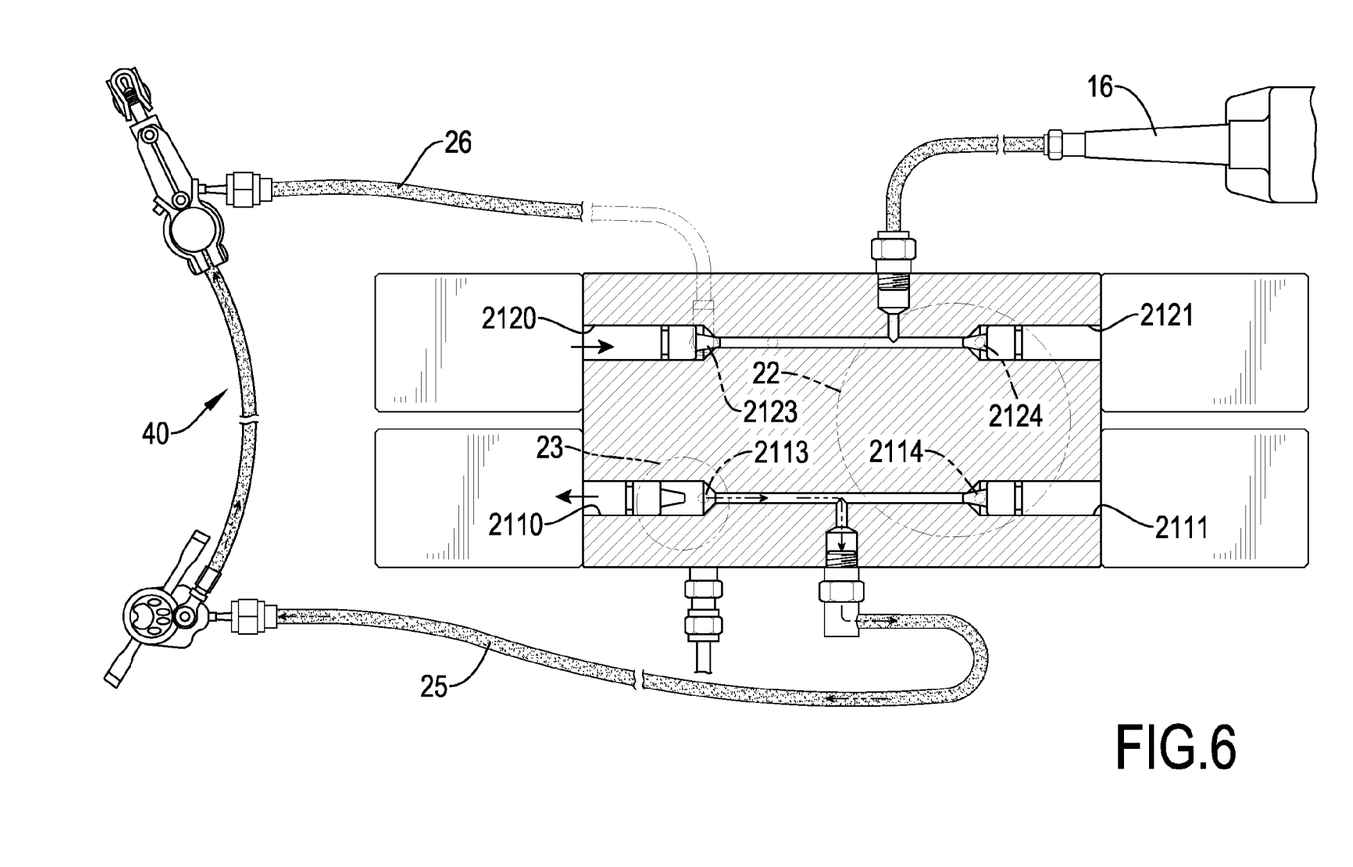
FIG. 6 is an operational top view in partial section of the oil replacement apparatus in FIG. 1 showing the new oil being injected.

With reference to FIGS. 1, 2 and 6, the oil replacement apparatus in accordance with the present invention is applied to inject new oil into the hydraulic brake assembly 40.

First, the oil inlet 2113 is closed. The vents 2114, 2124 and the oil entrance 2123 are opened. The vacuum pump 22 completely draws out air in the base 21, the injection pipe 25, the hydraulic brake assembly 40 and the drainpipe 26 to vacuum the base 21, the injection pipe 25, the hydraulic brake assembly 40 and the drainpipe 26.

Second, the oil inlet 2113 is opened to enable new oil in the oil tank 23 to flow out. The vent 2114 of the first channel 211 is closed, the oil entrance 2123 is closed, and the vent 2124 of the second channel 212 is closed. Because the base 21, the injection pipe 25, the hydraulic brake assembly 40 and the drainpipe 26 are vacuumed, the new oil is capable of flowing through the oil inlet 2113, the exit 2115, the injection pipe 25 and into the caliper unit 41. During the replenishing process, the controller 31 and control valve unit 33 can control volume of the injected new oil.

Third, part of the new oil in the hydraulic brake assembly 40 flows out of the hydraulic brake assembly 40 and into the drainpipe 26 for ensuring the hydraulic brake assembly 40 is filled with new oil. Accordingly, the hydraulic brake assembly 40 is replenished with the new oil.

Finally, the release solenoid valve 34 is activated to let air in the environment flow into the second channel 212 via the releasing hole 2125. The check valve 232 can prevent the air flowing toward the release solenoid valve 34, and the aerometer 233 is used to measure the air pressure in the oil replenishing assembly 20.

Figure 8:
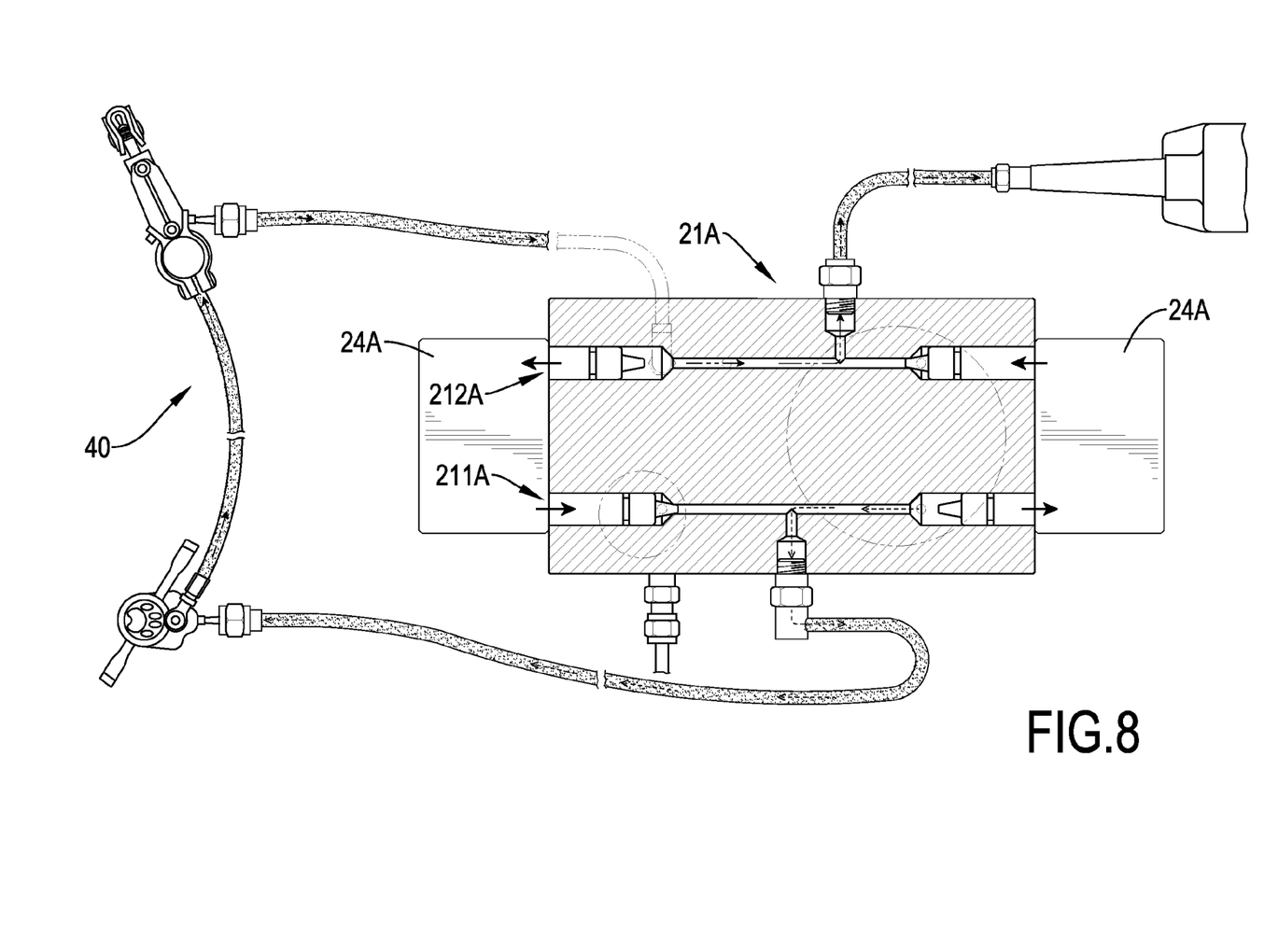
FIG. 8 is an operational top view in partial section of a second embodiment of an oil replacement apparatus in accordance with the present invention.

With reference to FIG. 8, a second embodiment of the oil replacement apparatus is substantially the same as the first embodiment.

Two control cylinders 24A are implemented, are respectively mounted on the first side sections of the outer surface of the base 21A. Each control cylinder 24A is pneumatic and has two movable cylinder rods respectively inserted into corresponding two of the openings of the first channel 211A and the second channel 212A at one of the first side sections of the outer surface of the base 21A.

From the above description, it is noted that the present invention has the following advantages:

1. Automatic replacement:

The oil replacement apparatus in accordance with the present invention can automatically and precisely replace oil in the hydraulic brake assembly 40, and this is greatly convenient and fast.

2. Prevention from penetration of air in the environment:

The vacuum pump 22 vacuums the base 21, the injection pipe 25, the hydraulic brake assembly 40 and the drainpipe 26 before the new oil is injected. Accordingly, air in the environment is prevented from entering the hydraulic brake assembly 40.

What is claimed is:

1. An oil replacement apparatus comprising:
  a housing having a main space formed inside the housing;
  an oil replenishing assembly mounted in the main space of the housing and having:
    a base having
      an outer surface having
        two opposite first side sections; and
        two opposite second side sections; and
      a canal set formed inside the base and having
        a T-shaped first channel latitudinally formed through the base and having
          two opposite openings respectively formed in the first side sections of the outer surface of the base; and
          an exit formed in one of the second side sections of the outer surface of the base;
        a T-shaped second channel latitudinally formed through the base, parallel to the first channel and having
          two opposite openings respectively formed in the first side sections of the outer surface of the base;
          an oil entrance formed in the outer surface of the base;
          a releasing hole formed in the outer surface of the base; and
          an oil outlet formed in the outer surface of the base, wherein the releasing hole is located between the oil outlet and the oil entrance;
    a vacuum pump mounted on the base and communicating with the first channel and the second channel;
    an oil tank mounted on the base, communicating with the first channel, and having a check valve connected with the releasing hole;
    multiple control cylinders respectively mounted on the first side sections of the outer surface of the base to close the openings of the first channel and the second channel;
    an injection pipe securely connected with and communicating with the exit;
    a drainpipe securely connected with and communicating with the oil entrance; and
  a controlling assembly mounted in the main space of the housing and having
    a controller;
    a switch unit electrically connected with the controller and having multiple switches capable of corresponding to commands in the controller;
    a control valve unit electrically connected with the controller, and connected with the vacuum pump and the control cylinders by tubes; and
    a release solenoid valve connected with the control valve unit and the check valve.

2. The oil replacement apparatus as claimed in claim 1, wherein
  four control cylinders are implemented and are respectively inserted into the four openings of the first channel and the second channel.

3. The oil replacement apparatus as claimed in claim 2, wherein each control cylinder is pneumatic and has a movable cylinder rod.

4. The oil replacement apparatus as claimed in claim 1, wherein
  two control cylinders are implemented, are respectively mounted on the first side sections of the outer surface of the base; and
  each control cylinder is pneumatic and has two movable cylinder rods respectively inserted into corresponding two of the openings of the first channel and the second channel at one of the first side sections of the outer surface of the base.

5. The oil replacement apparatus as claimed in claim 1, wherein
the controller is a programmable logic controller (PLC); and the control valve unit has multiple solenoid valves.

6. The oil replacement apparatus as claimed in claim 2, wherein
the controller is a programmable logic controller (PLC); and the control valve unit has multiple solenoid valves.

7. The oil replacement apparatus as claimed in claim 3, wherein
the controller is a programmable logic controller (PLC); and the control valve unit has multiple solenoid valves.

8. The oil replacement apparatus as claimed in claim 4, wherein
the controller is a programmable logic controller (PLC); and the control valve unit has multiple solenoid valves.

9. The oil replacement apparatus as claimed in claim 5, wherein
the housing has a partition mounted inside the housing to divide an inner space of the housing into the main space and a secondary space; and
a jerrican is mounted in the secondary space of the housing and is connected with and communicates with the oil outlet.

10. The oil replacement apparatus as claimed in claim 6, wherein
the housing has a partition mounted inside the housing to divide an inner space of the housing into the main space and a secondary space; and
a jerrican is mounted in the secondary space of the housing and is connected with and communicates with the oil outlet.

11. The oil replacement apparatus as claimed in claim 7, wherein
the housing has a partition mounted inside the housing to divide an inner space of the housing into the main space and a secondary space; and
a jerrican is mounted in the secondary space of the housing and is connected with and communicates with the oil outlet.

12. The oil replacement apparatus as claimed in claim 8, wherein
the housing has a partition mounted inside the housing to divide an inner space of the housing into the main space and a secondary space; and
a jerrican is mounted in the secondary space of the housing and is connected with and communicates with the oil outlet.

* * * * *